(12) United States Patent
Cao et al.

(10) Patent No.: US 11,705,685 B2
(45) Date of Patent: Jul. 18, 2023

(54) DISPERSION MANAGEMENT METHOD AND APPARATUS BASED ON NON-PERIODIC SPECTRAL PHASE JUMPS

(71) Applicant: Xi'an Institute of Optics and Precision Mechanics of CAS, Shaanxi (CN)

(72) Inventors: Huabao Cao, Shaanxi (CN); Yuxi Fu, Shaanxi (CN); Hushan Wang, Shaanxi (CN); Pei Huang, Shaanxi (CN); Xin Liu, Shaanxi (CN); Hao Yuan, Shaanxi (CN)

(73) Assignee: Xi'an Institute of Optics and Precisions Mechanics of CAS, Shaanxi (CN)

( * ) Notice: Subject to any disclaimer, the term of this patent is extended or adjusted under 35 U.S.C. 154(b) by 94 days.

(21) Appl. No.: 17/643,057

(22) Filed: Dec. 7, 2021

(65) Prior Publication Data

US 2022/0181834 A1     Jun. 9, 2022

(30) Foreign Application Priority Data

Dec. 8, 2020   (CN) .......................... 202011443306.6

(51) Int. Cl.
*H01S 3/00* (2006.01)
*H01S 3/10* (2006.01)
*G02B 26/06* (2006.01)
*G02F 1/01* (2006.01)

(52) U.S. Cl.
CPC ............ *H01S 3/0057* (2013.01); *G02B 26/06* (2013.01); *G02F 1/0102* (2013.01); *H01S 3/10053* (2013.01)

(58) Field of Classification Search
CPC ... H01S 3/0057; H01S 3/10053; G02B 26/06; G02F 1/0102
See application file for complete search history.

(56) References Cited

U.S. PATENT DOCUMENTS

| | | | | |
|---|---|---|---|---|
| 7,787,720 B2 * | 8/2010 | Frisken | ................ | G02B 6/2793 385/20 |
| 2006/0017999 A1 * | 1/2006 | Vaughan | ................ | H01S 3/0057 359/237 |

* cited by examiner

*Primary Examiner* — Michael Carter
(74) *Attorney, Agent, or Firm* — NKL Law; Allen Xue

(57) ABSTRACT

The disclosure provides a dispersion management method and apparatus based on non-periodic spectral phase jumps. Precise dispersion is provided by virtue of non-periodic spectral phase jumps, the dispersion can be tuned freely with engineering of the phase jump. A device based on non-periodic spectral phase jump also has a wide working bandwidth and could promote the development of ultrafast optics. The method includes: spatially separating a light pulse with different frequency components, and meanwhile, making the light pulse with the different frequency components propagate in parallel; enabling the light pulse with the different frequency components and propagating in parallel to be incident on a non-periodic phase jump device to obtain non-periodic spectral phase jumps, forming a phase grating effect to obtain two ±1-order diffracted pulses having opposite group delays, and introducing frequency dependent relative delay for the different spectral components in the two diffracted pulses.

10 Claims, 3 Drawing Sheets

DISPERSION MANAGEMENT METHOD AND APPARATUS BASED ON NON-PERIODIC SPECTRAL PHASE JUMPS

FIELD

The present disclosure relates to the field of ultrafast laser, in particular to a dispersion management method and apparatus based on non-periodic spectral phase jumps.

BACKGROUND

For ultrafast optics, dispersion control of the ultrashort pulses so as to shape the pulses is a crucial tool for applications such as ultrafast spectroscopy, coherent control and high-order harmonics generation.

In ultrashort pulse lasers, in particular, femtosecond lasers, dispersion may result in some major physical problems, and dispersion management is a key technology. Dispersion in an optical medium is a phenomenon that the phase velocity and the group velocity of light propagating in a transparent medium change with the frequency. Dispersion characteristics significantly affect the transmission of a pulse, and the pulse has a certain spectral width range, and therefore, frequency components may be transmitted at different velocities. In the case of normal dispersion, the group velocity of a high-frequency part is smaller, and therefore, positive chirp is generated; and negative chirp is generated in the case of abnormal dispersion. The pulse duration can be expanded when same kind of dispersion is introduced, and the pulse duration can be compressed with opposite kind of dispersion. Therefore, dispersion management is of great importance to the achievement of the ultrashort pulse laser, in particular, the ultrashort pulse laser with few-cycle pulse duration.

At present, traditional dispersion management is mainly achieved in the following methods. (1) Materials, such as glass, gas and a crystal, having frequency-dependent refractive indexes are adopted, and dispersion management is achieved by virtue of the dispersion characteristics of the materials. However, such a method may introduce different-order dispersion according to different materials, and thus, relevant applications are limited. (2) Optical devices, such as prisms and gratings, with frequency-dependent optical paths are adopted. The prism is mainly used for compensating three-order dispersion, and the grating is a common dispersion management device in ultrafast laser. The common grating generally includes: (a) a diffraction grating pair which is based on a principle that when a light pulse is incident on one grating in a grating pair including two gratings which are parallel to each other, diffraction angles of different frequency components in the pulse are different, when the pulse reaches the second grating, the various frequency components are delayed differently so that dispersion management may be achieved, and such a dispersion device is large in space occupancy and may bring the problems such as high loss, structure complexity and adjustment difficulty; and (b) for a chirped fiber grating, the grating period is not uniform and changes along the axial direction of a fiber core, different grating periods correspond to different Bragg reflection wavelengths, and delay differences are generated for short wavelengths and long wavelengths, so that dispersion management is achieved; however, the chirped fiber grating is required to be fabricated by using additional apodization technology and is required to be used by cooperation with a circulator in a ring cavity fiber laser device; and besides, the chirped fiber grating may generally introduce excessive dispersion, and thus, precise dispersion management may not be achieved. (3) A chirped mirror with a frequency-dependent electric field penetration depth is adopted, such a device works based on a principle that by designing a multi-layer film, light fields with different frequencies are reflected on different depths, then, different phases are introduced to the different frequencies, and thus, dispersion management is achieved. The major problem of such a manner lies in that high-bandwidth dispersion control is difficult to achieve, and a lower damage threshold is caused by the multi-layer film structure. (4) A programmable pulse shaper is adopted, mainly including an acousto-optic programmable dispersive filter and a spatial light modulator. The acousto-optic programmable dispersive filter controls the spectral intensity and phase of diffraction light by controlling the intensity and waveform of a sound wave in a crystal, and the spatial light modulator modulates an optical path for spectral resolution by a device (such as a liquid crystal, MEMS and a deformable mirror) located on a Fourier plane in a 4f zero-dispersion compressor. However, the acousto-optic programmable dispersive filter may not be applied to a high-repetition-rate laser device, and a traditional spatial light modulator is relatively complicated in structure and difficult in phase control and calibration.

SUMMARY

For solving the aforementioned problems, the present disclosure provides a dispersion management method and apparatus based on non-periodic spectral phase jumps. In the method and the apparatus, precise two-order, three-order or higher-order dispersion can be provided by virtue of non-periodic spectral phase jumps, the dispersion value is flexible and controllable according to programming and is large in dispersion range, and a non-periodic spectral phase jump device also has a wide working bandwidth and will promote the development of ultrafast optics, in particular, ultrafast laser technologies.

In order to achieve the above-mentioned inventive purpose, the present disclosure adopts the technical solutions as follows.

A dispersion management method based on non-periodic spectral phase jumps includes the following steps:

step 1, spatially separating a light pulse with different frequency components, and meanwhile, making the light pulse with the different frequency components propagate in parallel; and step 2, enabling the light pulse with the different frequency components and propagating in parallel to be incident on a non-periodic phase jump device to obtain non-periodic spectral phase jumps, forming a phase grating effect by the non-periodic spectral phase jumps to obtain two ±1-order diffracted pulses with opposite group delays, and introducing different relative delays to light pulses with different frequency components in the two diffracted pulses by the non-periodic spectral phase jumps, thereby introducing dispersion to the diffracted pulses.

Meanwhile, the present disclosure further provides a dispersion management apparatus based on non-periodic spectral phase jumps. The dispersion management apparatus includes a grating, a spherical mirror and a non-periodic phase jump device. After a pulse passes by the grating and the spherical mirror, a light pulse with different frequency components is spatially separated, and the light pulse with the different frequency components propagates in parallel; and the light pulse with the different frequency components and propagating in parallel is incident on the non-periodic phase jump device to obtain non-periodic spectral phase jumps, a phase grating effect is formed by the non-periodic spectral phase jumps to obtain two ±1-order diffracted pulses having opposite group delays, and different relative delays are introduced to light pulses with different frequency components in the two diffracted pulses by the non-periodic spectral phase jumps, so that dispersion is introduced to the diffracted pulses.

Further, a phase jump difference of the non-periodic spectral phase jumps is $\pi$.

Further, the non-periodic phase jump device is a liquid crystal or MEMS located on a Fourier plane.

Further, the MEMS located on the Fourier plane is a micromirror array or a grating light valve.

Further, the grating light valve includes a substrate, a flat panel and N strip-shaped thin reflection sheets; the flat panel is arranged on an upper end of the substrate and serves as a common electrode, and the N strip-shaped thin reflection sheets are arranged above the flat panel and are arranged in parallel to the flat panel; and the strip-shaped thin reflection sheets are provided with coatings for different wavelengths, and the N strip-shaped thin reflection sheets are located on the same plane or staggered on different planes.

Compared with the prior art, the technical solutions of the present disclosure have the following beneficial effects:

1. Compared with traditional dispersion devices, the dispersion management method and apparatus provided by the present disclosure have multiple advantages: (a) various high-order dispersion can be achieved, and the dispersion value is precise and controllable; (b) by selecting the grating and the phase modulator, requirements of different working wavelengths are met; (c) compared with the acousto-optic programmable dispersive filter, the dispersion management apparatus can be applied under the condition of high repetition rate and is simpler and more reliable in structure; and (d) compared with other dispersion devices based on the spatial light modulator, the dispersion management apparatus has a greatly simplified calibration process.

2. By using the dispersion management method and apparatus provided by the present disclosure, different-order arbitrary dispersion management can be achieved within a broadband range, various indexes are superior to those of the traditional dispersion device, and the dispersion management method and apparatus can be applied to ultrafast optics, in particular, an ultrafast laser device.

3. By using the dispersion management method and apparatus provided by the present disclosure, one pulse can be changed into two pulses having opposite dispersion values, meanwhile, the device can introduce arbitrary dispersion to the two pulses, and the two pulses have important application values in applications such as pump and probe experiments.

Figure 1:
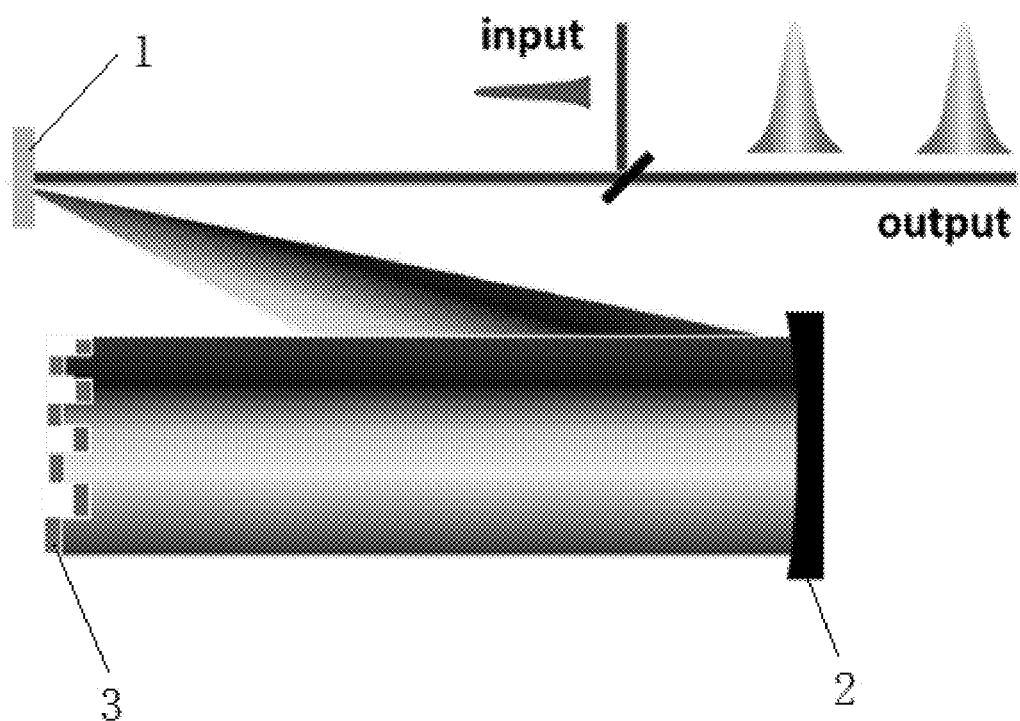
FIG. 1 is a schematic diagram of a dispersion management apparatus based on non-periodic spectral phase jumps in the present disclosure.

Reference numerals in the accompanying drawings: 1—grating, 2—spherical mirror, 3—non-periodic phase jump device, 31—substrate, 32—flat panel, and 33—strip-shaped thin reflection sheet.

DETAILED DESCRIPTION OF THE EMBODIMENTS

In order to further understand the present disclosure, the preferred implementation solutions of the present disclosure will be described below in combination with the embodiments. However, it should be understood that these descriptions are intended to further explain the features and advantages of the present disclosure, rather than limiting the claims of the present disclosure.

The present disclosure provides a dispersion management method and apparatus based on non-periodic spectral phase jumps. By using the method and the apparatus, arbitrary dispersion management is achieved by virtue of non-periodic spectral phase jumps, and different-order dispersion can be adjusted arbitrarily, so that performance indexes of a dispersion device are effectively increased, and the dispersion device can be applied to an ultrashort pulse laser device and plays an important role, thereby promoting the development of an ultrafast laser technology.

The dispersion management method based on the non-periodic spectral phase jumps in the present disclosure specifically includes the following steps:

step 1, a light pulse with different frequency components is spatially separated, and meanwhile, the light pulse with the different frequency components propagates in parallel;

step 2, the light pulse with the different frequency components and propagating in parallel is incident on a non-periodic phase jump device to obtain non-periodic spectral phase jumps, a phase grating effect is formed by the non-periodic spectral phase jumps to obtain two ±1-order diffracted pulses having opposite group delays, and different relative delays are introduced to light pulses with different frequency components in the two diffracted pulses by the non-periodic spectral phase jumps, so that dispersion is introduced to the diffracted pulses.

In a preferred embodiment of the present disclosure, a phase jump difference of the non-periodic spectral phase jumps is $\pi$, and zero-order pulses may be eliminated.

As shown in FIG. 1, the dispersion management apparatus based on the non-periodic spectral phase jumps in the present disclosure includes a grating 1, a spherical mirror 2 and a non-periodic phase jump device 3. After a pulse passes by the grating 1 and the spherical mirror 2, a light pulse with different frequency components is spatially separated, and the light pulse with the different frequency components propagates in parallel. The light pulse with the different frequency components is incident on the non-periodic phase jump device 3, arbitrary dispersion value of arbitrary order may be achieved according to the design and adjustment of non-periodic phase jumps, the light pulse is reflected on a surface of a phase modulator to achieve frequency resolution modulation of an optical path, angular dispersion is removed after the light pulse is reflected by the spherical mirror 2 and the grating 1, and two main pulses with opposite dispersion are generated. In actual applications, in particular, ultrafast laser applications, generally, optimization and management are performed for the dispersion of one pulse. In addition, the efficiency of the device is related to the frequency resolution of MEMS and the size of the focus spot of a single frequency component.

Figure 3:
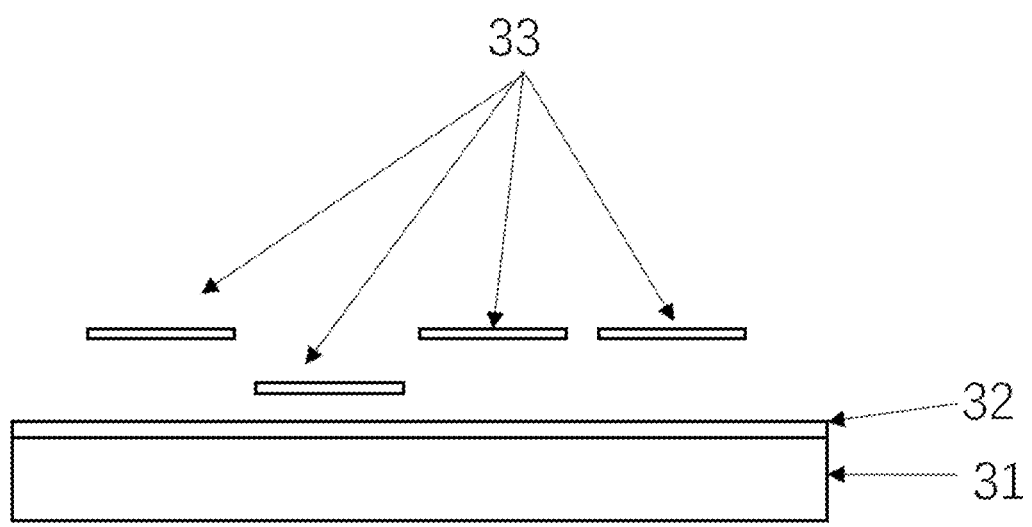
FIG. 3 is a schematic diagram of a structure of a grating light valve in the present disclosure.

The non-periodic spectral phase jumps in the present disclosure are achieved by spatial light modulation based on MEMS (Micro-Electro-Mechanical System), only the degree of freedom of normal movement is needed without tilting, and therefore, a spatial light modulation device has a simple and reliable structure. The spatial light modulation device, that is, the non-periodic phase jump device 3, may be specifically MEMS or a liquid crystal located on a Fourier plane, and the MEMS located on the Fourier plane may be a micromirror array or a grating light valve. FIG. 3 is a schematic diagram of the grating light valve. A flat panel 32 is attached on a substrate 31 and serves as a common electrode, and a plurality of strip-shaped thin reflection sheets 33 are arranged above the flat panel 32. The strip-shaped thin reflection sheets 33 may be coated for different wavelengths and are capable of applying voltages to be close to the substrate 31 under the action of an electrostatic force, thereby changing optical paths of light pulse incident on the strip-shaped thin reflection sheets.

Figure 2:
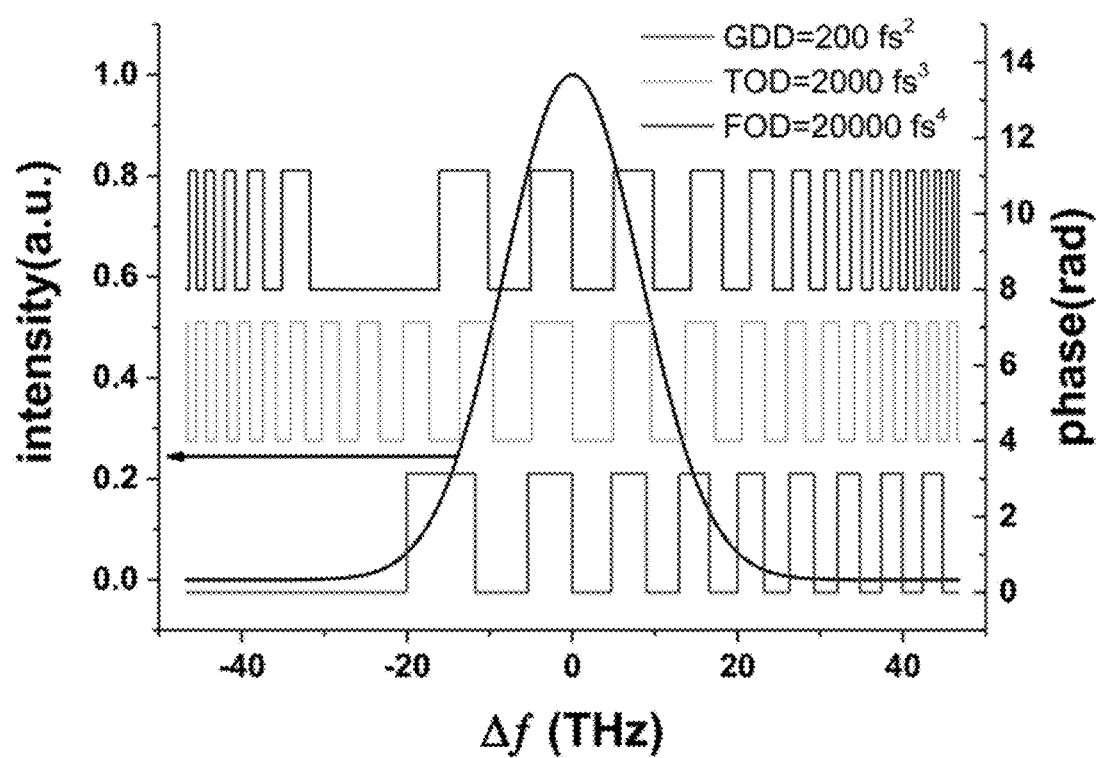
FIG. 2 is a schematic diagram showing that dispersion is introduced by non-periodic spectral phase jumps in a method provided by the present disclosure.

A basic principle of the non-periodic phase jump device 3 is that the phase grating effect for the pulse is formed by the non-periodic spectral phase jumps, so that two ±1-order diffracted pulses having opposite group delays may be obtained, and the two pulses have the same dispersion. The delays of the different frequency components may be changed by the non-periodic phase jumps, and thus, dispersion is introduced to these pulses, and the dispersion of a −1-order pulse is opposite to that of a +1-order pulse. For example, dispersion introduced by the non-periodic phase jumps under a condition may be achieved by simulation, as shown in FIG. 2, group delay dispersion is 200 $fs^2$, three-order dispersion is 2000 $fs^3$, and four-order dispersion is 200000 $fs^4$.

Compared with traditional dispersion devices, the dispersion management method and apparatus provided by the present disclosure have multiple advantages: (a) various high-order dispersion can be achieved, and the dispersion value is precise and controllable; (b) by selecting the grating and the phase modulator, requirements of different working wavelengths are met; (c) compared with an acousto-optic programmable dispersive filter, the dispersion management apparatus provided by the present disclosure can be applied under the condition of high repetition rate and is simpler and more reliable in structure; and (d) compared with other dispersion devices based on the spatial light modulator, the dispersion management apparatus has a greatly simplified calibration process.

Compared with periodic phase jumps by which the dispersion cannot be obtained, the non-periodic spectral phase jumps utilized by the dispersion management method and apparatus provided by the present disclosure achieve arbitrary dispersion management and arbitrary adjustment of different-order dispersion, so that performance indexes of a dispersion device are effectively increased.

By using the dispersion management method and apparatus provided by the present disclosure, one pulse can be changed into two pulses having opposite dispersion values, meanwhile, arbitrary dispersion can be introduced to the two pulses, and the two pulses have important application values in applications such as pump and probe experiments.

What is claimed is:

1. A dispersion management method based on non-periodic spectral phase jumps, comprising the following steps:
   step 1, spatially separating a light pulse with different frequency components, and meanwhile, making the different frequency components propagate in parallel; and
   step 2, enabling the light pulse with the different frequency components and propagating in parallel to be incident on a non-periodic phase jump device to obtain non-periodic spectral phase jumps, forming a phase grating effect by the non-periodic spectral phase jumps to obtain two ±1-order diffracted pulses having opposite group delays, and introducing different relative delays to light pulses with different frequency components in the two diffracted pulses by the non-periodic spectral phase jumps, thereby introducing dispersion to the diffracted pulses.

2. The dispersion management method based on the non-periodic spectral phase jumps according to claim 1, wherein in the step 2, a phase jump difference of the non-periodic spectral phase jumps is $\pi$.

3. The dispersion management method based on the non-periodic spectral phase jumps according to claim 1, wherein in the step 2, the non-periodic phase jump device is a liquid crystal or MEMS located on a Fourier plane.

4. The dispersion management method based on the non-periodic spectral phase jumps according to claim 3, wherein the MEMS located on the Fourier plane is a micromirror array or a grating light valve.

5. The dispersion management method based on the non-periodic spectral phase jumps according to claim 4, wherein the grating light valve comprises a substrate, a flat panel and N strip-shaped thin reflection sheets; the flat panel is arranged on an upper end of the substrate and serves as a common electrode, and the N strip-shaped thin reflection sheets are arranged above the flat panel and are arranged in parallel to the flat panel; the strip-shaped thin reflection sheets are provided with coatings for different wavelengths, and the N strip-shaped thin reflection sheets are located on the same plane or staggered on different planes; and the strip-shaped thin reflection sheets apply voltages to be close to the substrate under the action of an electrostatic force, thereby changing optical paths of the light pulse incident on the strip-shaped thin reflection sheets.

6. A dispersion management apparatus based on non-periodic spectral phase jumps, comprising a grating (1), a spherical mirror (2) and a non-periodic phase jump device (3); and
   wherein after a pulse passes by the grating (1) and the spherical mirror (2), a light pulse with different frequency components is spatially separated, and the light pulse with the different frequency components propagates in parallel; and the light pulse with the different frequency components and propagating in parallel is incident on the non-periodic phase jump device (3) to obtain non-periodic spectral phase jumps, a phase grating effect is formed by the non-periodic spectral phase jumps to obtain two ±1-order diffracted pulses having opposite group delays, and different relative delays are introduced to light pulses with different frequency components in the two diffracted pulses by the non-periodic spectral phase jumps, so that dispersion is introduced to the diffracted pulses.

7. The dispersion management apparatus based on the non-periodic spectral phase jumps according to claim 6, wherein a phase jump difference of the non-periodic spectral phase jumps is $\pi$.

8. The dispersion management apparatus based on the non-periodic spectral phase jumps according to claim 6, wherein the non-periodic phase jump device (3) is a liquid crystal or MEMS located on a Fourier plane.

9. The dispersion management apparatus based on the non-periodic spectral phase jumps according to claim 8, wherein the MEMS located on the Fourier plane is a micromirror array or a grating light valve.

10. The dispersion management apparatus based on the non-periodic spectral phase jumps according to claim 9, wherein the grating light valve comprises a substrate (31), a flat panel (32) and N strip-shaped thin reflection sheets (33);

the flat panel (32) is arranged on an upper end of the substrate (31) and serves as a common electrode, and the N strip-shaped thin reflection sheets (33) are arranged above the flat panel (32) and are arranged in parallel to the flat panel (32); and the strip-shaped thin reflection sheets (33) are provided with coatings for different wavelengths, and the N strip-shaped thin reflection sheets (33) are located on the same plane or staggered on different planes.

* * * * *